United States Patent [19]
Hamm et al.

[11] 3,742,466
[45] June 26, 1973

[54] MEMORY SYSTEM FOR RECEIVING AND TRANSMITTING INFORMATION OVER A PLURALITY OF COMMUNICATION LINES

[75] Inventors: Larry E. Hamm, Hudson; Peter I. Morley, Bellingham, both of Mass.

[73] Assignee: Honeywell Information Systems Inc., Waltham, Mass.

[22] Filed: Nov. 24, 1971

[21] Appl. No.: 201,746

[52] U.S. Cl. ...... 340/173 RC, 307/221 R, 307/241, 340/172.5

[51] Int. Cl. .......................... G11c 19/00, G06f 3/04

[58] Field of Search .................. 340/173 RC, 172.5; 307/221 R, 241

[56] References Cited

UNITED STATES PATENTS

| | | | |
|---|---|---|---|
| 3,350,697 | 10/1967 | Hirvela | 340/172.5 |
| 3,579,203 | 5/1971 | Malmer | 340/173 RC |
| 3,523,284 | 8/1970 | Washizuka | 340/173 RC |

OTHER PUBLICATIONS

Beausoleil, Shift Register Storage, 10/70, IBM Technical Disclosure Bulletin, Vol. 13 No. 5, pp. 1336–1337.

Anacker, Memory Employing Integrated Circuit Shift Register Rings, 6/68, IBM Technical Disclosure Bulletin, Vol. 11 No. 1, pp. 12–13a.

*Primary Examiner*—Bernard Konick
*Assistant Examiner*—Stuart Hecker
*Attorney*—John S. Solakian, Ronald T. Reiling et al.

[57] ABSTRACT

The memory system includes a plurality of circulating memories equal in number to the number of bits in a character, each circulating memory including a plurality of storage locations associated with and corresponding in number to the number of communication lines. Associated with each circulating memory is a bistable storage means coupled between the output and input of the associated circulating memory by means of enabling gates. Each of the bistable storage means is connected in shift register arrangement also by means of enabling gates. The bits of each character are circulated in the circulating memories until the communication line with which the storage locations of said memories is associated is ready for transfer of at least one bit of the character in which case, for the transmit mode, a bit of the character is serially shifted out of the shift register arrangement of bistable storage means to the line or for the receive mode into the shift register arrangement of bistable storage means from the line.

14 Claims, 2 Drawing Figures

MEMORY SYSTEM FOR RECEIVING AND TRANSMITTING INFORMATION OVER A PLURALITY OF COMMUNICATION LINES

BACKGROUND OF THE INVENTION

The present invention relates generally to communications apparatus and more particularly to a memory system for transmitting and receiving characters over a plurality of communication lines.

Communication systems frequently receive and transmit information in multiplexed fashion from and to a plurality of communication lines. One of the reasons for using a plurality of lines is that the digital processor associated with the communications system can handle data at a far greater speed than the handling capabilities of the communciation lines. The use of a plurality of lines does require some form of multiplexing. The present invention is concerned with multiplexing data from and to the communication lines and carrying out the preprocessing steps necessary so that complete characters can be entered into and conversely accepted from the processor.

In the prior art, this preprocessing has been accomplished by collecting the complete characters for each line in several registers and then coupling each register with the processor in accordance with a predetermined sequence. The number of registers thus required however can get quite cumbersome. Another apparatus of the prior art is described in U.S. Pat. No. 3,350,697, issued Oct. 31, 1967, which patent illustrates a storage means for receiving, assembling and distributing teletype characters. In accordance with the apparatus of that patent, a plurality of circulating memories are provided. Five of such circulating memories are provided to hold the five "bauds" (elements) of a character, and eight additional circulating memories are provided to implement the timekeeping functions which are necessary for sampling the bauds stored therein at the proper time for transmission to the data processor. The five data storing circulating memories are designed to receive a baud from a teletypewriter and to repetitively circulate the baud completely around such circulating memory in a predetermined time interval. Where the time interval is 1024 microseconds, then in each of the five data holding circulating memories, a baud from each of 512 different teletypewriters can be stored and circulated 2 microseconds apart. A binary counter is utilized to selectively and successively connect the outputs of the various teletypewriters to the inputs of the five baud storing circulating memories and in so doing provides an address for the stored baud which address corresponds to the particular count at which a particular typewriter is selected for transfer of data to the circulating memories. Associated with this prior art is a high number of time keeping counters as well as complex logic circuitry for transferring information into and out of the circulating memories.

In contrast, the apparatus of the present invention utilizes one bistable means or a flip-flop in association with each of a plurality of circulating memories. These flip-flops are coupled between the output of its circulating memory and the input of its circulating memory. If a particular line does not require servicing, the information, i.e., the bits of each character, are repetitively circulated in the circulating memories. Each of the bistable means associated with each of the circulating memories are also coupled in a shift register arrangement so that when a particular line requires servicing, the bits are first circulated in the circulating memory directly after which the bits are shifted in the shift register arrangement so that one of the bits is shifted either into the shift register arrangement of bistable means or out of such shift register arrangment depending upon whether the apparatus is receiving or transmitting respectively. Thus, like numbered bits of various characters which are to be transmitted or received over any one of the plurality of communication lines are circulating in different ones of the circulating memories at any given time. This arrangement minimizes the time keeping and output circuitry required for the system thereby resulting in more reliable performance at a lower cost.

It is therefore an object of the present invention to provide an improved memory system for receiving and transmitting characters over a plurality of communications lines.

It is a further object of the present invention to provide a multiplexed communications system interface capable of providing parallel to serial conversion of bits of characters with simplified time keeping and control circuitry.

It is yet a further object of the invention to provide a multiplexed communication system interface which provides serial to parallel conversion of bits of characters while utilizing simplified time keeping and control circuitry.

SUMMARY OF THE INVENTION

The purposes and objects of the present invention are satisfied by providing a memory system for transmitting and/or receiving characters, each character including a plurality of bits, over a plurality of communications lines. The memory system comprises a plurality of circulating memories each having a plurality of storage locations, an input, and an output, the number of circulating memories being at least equal in number to the number of bits in such characters, and the number of locations being at least equal in number to the number of communications lines. A plurality of bistable storage means or "windows" connected in a shift register arrangement and equal in number to the number of circulating memories is also provided. Each of the bistable storage means includes means for circulating bits from the respective circulating memory outputs, through a storage portion such as a flip-flop of the bistable storage means, and into the respective memory inputs; and means for shifting bits stored in each of the bistable storage means serially through the next ordered ones of the plurality of bistable storage means.

BRIEF DESCRIPTION OF THE DRAWINGS

The advantages of the foregoing description of the present invention will become more apparent upon reading the accompanying detailed description in connection with the figures in which.

DETAILED DESCRIPTION OF THE PREFERRED EMBODIMENTS

Figure 1:
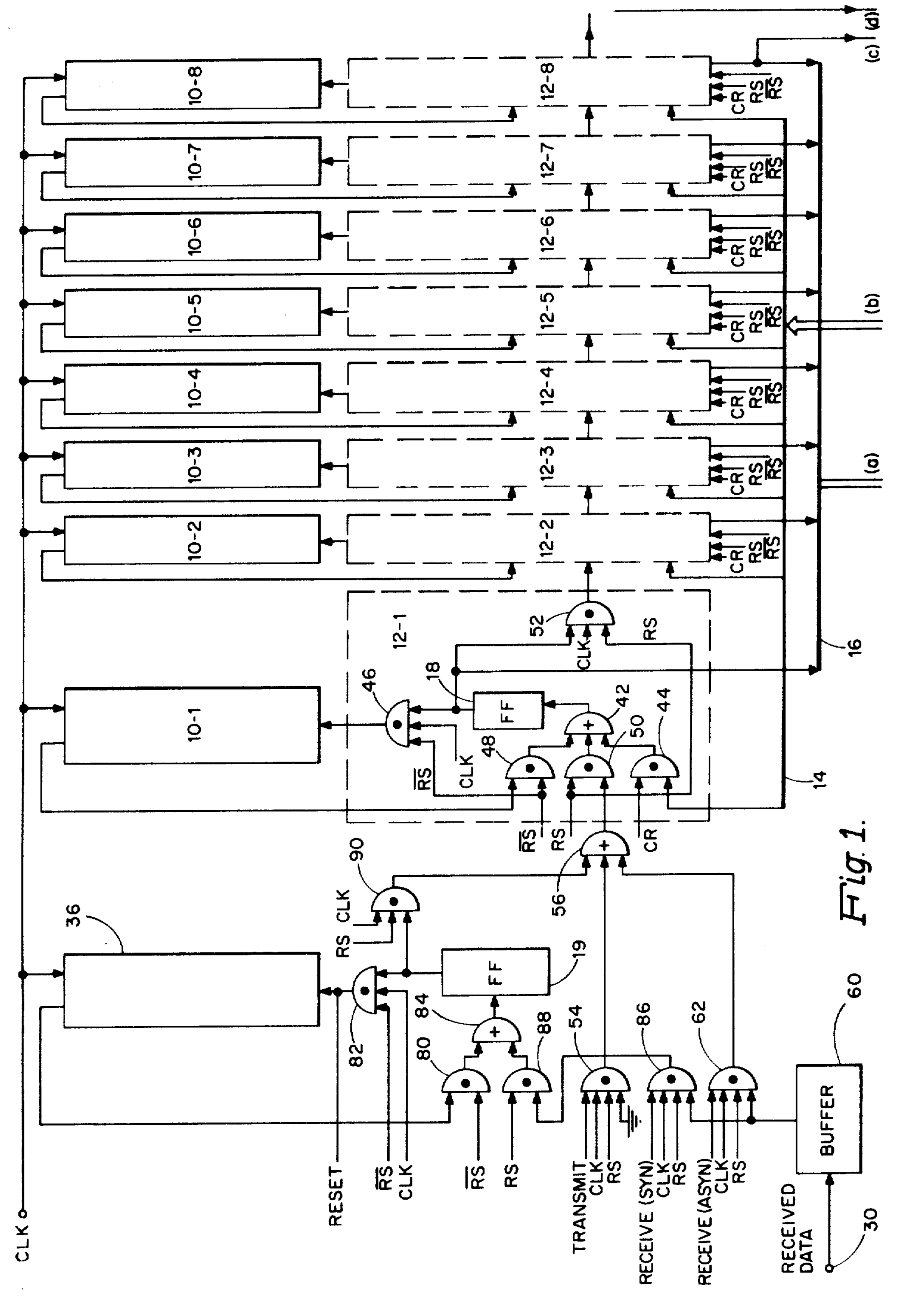
FIG. 1 illustrates the circulating memories, bistable storage means and associated logic circuitry of a preferred embodiment of the memory system of the invention.

FIG. 1 illustrates the circulating memories or shift registers 10-1 through 10-8 which are equal in number to the number of bits in a character. For the purpose of illustration, the number of bits in a character is assumed to be eight. Associated with each of the circulating memories 10 is a bistable storage means including various gates, hereinafter referred to as "windows" 12-1 through 12-8. Each window includes that circuitry specifically shown in window 12-1. However, it is understood that various logical equivalents may have been used. Window 12-1 is shown to include a flip-flop 18 as well as five AND gates (shown by the gate symbol with a dot therein), and a single OR gate (shown by a gate symbol with a plus sign therein). The input to the flip-flop 18 is coupled from either the bus 14, the output of the circulating memory 10, or from the previous window. The first window 12-1 does not receive one of its inputs from a window but rather from the received data input or a transmit signal gated circuit.

At this point, it should be noted that the basic circuitry of FIG. 1, including the circulating memories 10 and windows 12, may be duplicated for each function of the memory system of the invention. That is, such basic circuitry of FIG. 1 may be repeated and identical for both the transmit mode and the receive mode of operation.

In each mode, the circulating memories which may be shift registers comprising a plurality of flip-flops, have a number of flip-flops therein equal to the number of lines to be serviced. It should be understood however that the transmit and receive function modes may be combined such that for such dual mode, the circulating memories each have a number of flip-flops equal to twice the number of communication lines to be serviced. For purposes of our discussion, we will assume that such basic circuitry of FIG. 1 as well as some circuitry of FIG. 2 is repeated for each mode of operation.

The inputs to each flip-flop 18 (which may be one flip-flop of the physical circulating memory 10) of windows 12 have been described hereinbefore, the outputs of flip-flops 18 are coupled either to the inputs of its associated circulating memory 10 or to the next window. The outputs of flip-flops 18 are also connected to bus 16.

Figure 2:
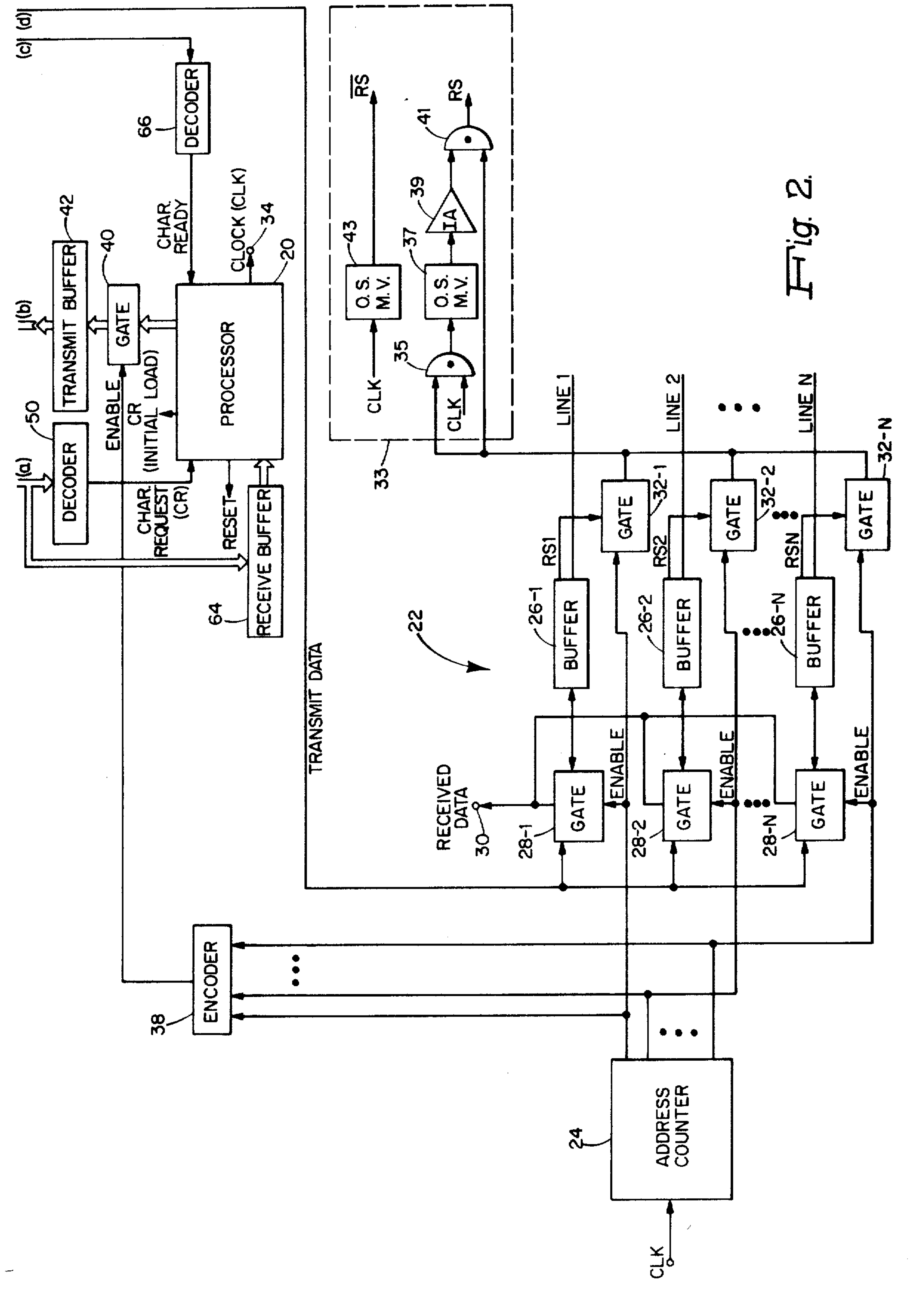
FIG. 2 illustrates the interface between the apparatus shown in FIG. 1 and the processor and communication lines comprising the total system of the invention.

FIG. 2 illustrates a processor 20 which is connected to transfer data to bus 14 or receive data from bus 16. Note that the apparatus of FIGS. 1 and 2 are coupled together as indicated by the function or the letter designations. FIG. 2 further illustrates the logic circuitry 22 coupled to communications lines 1 to N, which logic circuitry 22 is gated by an address counter 24. Circuitry 22 includes for each communication line a buffer 26 which includes a flip-flop for at least one bit of data and a flip-flop indicating a ready condition for the particular line. Also included in circuitry 22 is a bidirectional gate 28 so that transmit data may be received by buffer 26 for transfer on its associated line and so that data received from the line may be transmitted to the receive data terminal 30. Gates 32 are coupled to indicate that a particular line is ready for service when that line is addressed by address counter 24. Thus, if line 1 is ready for service, an RS 1 signal is generated which is transferred as signal RS via gate 32-1 as enabled by address counter 24 and logic 33.

More particularly the operation of the apparatus shown collectively in FIGS. 1 and 2 for the transmit mode of operation is as follows. Processor 20 or a suitable clock pulse source generates a stream of clock pulses (CLK) at terminal 34 which is coupled to the clock input of address counter 24 and which is also coupled to each of the circulating memories 10 as well as the circulating memory 36 to be hereinafter discussed for the receive mode of operation. Each clock pulse is generated within a "clock time" and is used to enable the various circuits as will be hereinafter discussed. The address counter 24 and the circulating memories 10 (as well as memory 36) are synchronized so that when the address for line 1 is generated by address counter 24, the character to be transmitted on line 1 or at least the remaining bits of the character to be transmitted on line 1 are in the windows 12 during the clock time in which such address is generated. In general, the operation of the apparatus of the invention during a clock time is as follows. During an initial portion of the clock time (for example the first half of the clock time) and regardless of whether the communication line addressed during the clock time is ready for service or not, gates 46 and 48 are enabled to provide circulation of one bit in each of the memories 10 and windows 12. Gates 50 and 52 are disabled. During the last portion of the clock time, gates 46 and 48 are disabled. Gates 50 and 52 are disabled during the last portion of the clock time unless the communication line addressed during the clock time is ready for service in which case gates 50 and 52 are enabled.

Initially, when the system is first put into operation, i.e., during the initial loading of memories 10, as address counter 24 generates addresses during successive clock times, encoder 38 generates a signal enabling gate 40 when the character to be transmitted is ready for transmission from the processor. The transmit buffer 42 receives such character via gate 40 and loads the bits of such character in parallel into respective flip-flops 18 of windows 12 via gates 42 and 44 as well as via bus 14. Note that gate 44 is enabled by the CR signal generated by the processor 20 for the initial load condition. During the next clock time, a character may be loaded into the windows 12 if such character is ready for transfer from processor 20 for the particular line addressed, in this case line 2. The character for line 1 in the meantime has been gated into the first storage position of the circulating memory 10 by means of gate 46, which gate 46 is enabled by a clock signal as well as the complement of the RS signal. Characters for the other ones of the communication lines are loaded in a like manner as indicated above. During each clock time, the character, for example the character for line 1, is advanced successively in successive storage positions of circulating memories 10 until after N clock times, the character for line 1 is again placed in the windows and more particularly flip-flop 18 by means of gates 42 and 48. Gate 48 is enabled by the complement of the RS signal.

It should be mentioned at this point that the RS and $\overline{RS}$ signals are generated in response to the outputs of gates 32 such that the $\overline{RS}$ signal is enabled during the first portion of the clock time and disabled during the second portion of the clock time and that the RS signal is disabled during the first portion of the clock time and if the line addressed is ready for service, is enabled during the second portion of the clock time. More particularly, circuit 33 includes a gate 35 responsive to the leading edge of the clock signal and the ready signal from one of gates 32 thereby triggering a one-shot multivibrator 37 having a time constant equal to about one-half the clock time. The output of multivibrator 37 is inverted by inverter 39 so that during the second half of the clock time, gate 41 is enabled by the high levels at its inputs, thereby generating the RS signal. The $\overline{RS}$ signal is enabled during the first half of the clock time by the presence of the signal from multivibrator 43 (set to have a time constant of about one-half the clock time) in response to the leading edge of the clock signal.

The character for line 1 is recircuited in the memories 10 until such time as its line 1, is ready to be serviced. In such case, signal RS 1 becomes high. When the address counter 24 addresses line 1, both gates 31-1 and 28-1 are enabled. The RS1 signal thus generates the RS signal and during the last portion of the clock time, inhibits gates 46 and 48 and enables gates 50 and 52 of the windows 12. During the first portion of this clock time, the bits in memories 10 are shifted one place so that the character or bits for the line addressed are in the windows 12. During the second portion of the clock time, the bits for line 1 are right shifted, to the next ordered window of windows 12, which are now connected in a shift register arrangement. The bit right shifted out of window 12-8 is received by gate 28-1 and enabled into buffer 26-1 for transmission over line 1. The flip-flop 18 of window 12 is also loaded by means of gate 54 which is enabled by the TRANSMIT, clock, and RS signals to load a binary zero as represented by the ground symbol into flip-flop 18 via gate 56 as well as gates 50 and 42 of window 12-1. Thus, during the next N number of clock times, the bit which was previously circulating in memory 10-1 is now being circulated in memory 10-2 and likewise the bit which was previously circulating in memory 10-7 is now circulating in memory 10-8. If during such N clock times, the line 1 then indicates that it is ready for service as represented by the RS 1 signal, then the next bit of that character will be transmitted in a like manner as was the first bit. It will be noted that as the bits of the character are successively transmitted, each of the windows are loaded with binary zeros. When each of the windows 12 is loaded with a binary zero, this indicates that the character for that particular line has been transmitted and this condition is detected by decoder 50 which is coupled to the output of each of the flip-flops 18 via bus 16. Decoder 50 then generates a character request signal (CR) in order to load another character into the windows 12 from processor 20. This process is repeated for a complete message.

Each of the other lines has bits of their respective characters transmitted in an interlaced fashion with each other such that for an N number of clock times it is possible to transmit N bits, one bit for each line. It can best be seen that the clock rate is determined by the number of lines to be serviced and the transmission rate of the fastest communication line to be serviced. The above explanation for the transmit mode of operation is generally applicable for both synchronous and asynchronous operation. For the receive mode of operation, the asynchronous and synchronous modes are treated slightly differently.

More particularly, for the receive mode of operation the operation of the apparatus shown in FIGS. 1 and 2 is as follows. When one of the lines is ready for service it supplies the RS signal from the respective buffer 26. When that line which is ready for service is addressed by address counter 24, the gate 32 is enabled to pass the RS signal. Data which has been previously received by buffer 26 is coupled by gate 28 to RECEIVED DATA terminal 30 and buffer 60. For asynchronous operation, the data is passed via gate 62 which is enabled by the clock signal, the RECEIVE (ASYN) signal and the RS signal. The bit from buffer 60 thus passes via gate 56 into the flip-flop 18 of window 12-1. This bit in window 12-1 is circulated in memory 10-1 for N clock times and if during such N clock times the same line is again ready for service, then when that line is again addressed by counter 24 a second bit of the character will be received via buffer 60 and shifted into window 12-1, the bit previously in window 12-1 being shifted into window 12-2. When each of the bits of the character have been received this condition is detected and the characters are sent to processor 20 via receive buffer 64. For the asynchronous mode of receive operation this condition, that is the condition of all bits for the character now being received, is sensed via the output of flip-flop 18 of window 12-8 via decoder 66. Because of the asynchronous operation, the start bit for a character is always for example a binary zero in which case the decoder 66 is set to indicate that a binary zero has been received. This assumed that all windows were preset to binary ones before receiving a character, by means not shown. Once the full character receive condition is detected by decoder 66, a character ready signal is sent to processor 20 and as stated before the character is transferred to processor 20 by receive buffer 64.

For synchronous operation, start bits are not provided with the character. Thus in order to detect a full character receive condition, an additional circulating memory 36 is utilized. Memory 36 as well as its associated gates and flip-flop 19 are similar to the memories 10 as well as its associated gates and flip-flop 18 respectively. Thus memory 36 includes a number of storage locations equal in number to the number of lines to be serviced. Memory 36 is preset with binary zeros in each of its storage locations. Gates 80 and 82 are utilized to recirculate the contents of memory 36 via gate 84 through flip-flop 19. In the receive synchronous data mode gate 86 is enabled to pass bits from buffer 60, and gate 88 is also enabled, both gates being enabled when a line addressed by the address counter 24 has its RS signal high. In such case the binary zero which was in flip-flop 19 because of the recirculating action of memory 36 and its associated gates, is right shifted into window 12-1 via gate 90 and the first bit of the synchronous character received is now stored in flip-flop 19. The memories circulate their contents and if the RS signal is again high for the respective line, then when such respective line is addressed, the binary zero in window 12-1 is right shifted into window 12-2, the first bit of the character in flip-flop 19 is right shifted into window 12-1, and the second bit of the character is shifted into flip-flop 19.

This operation continues until window 12-8 receives the binary zero signal. At this time, the binary zero signal condition may be sensed from window 12-8 indicating to decoder 66 that the character is ready for transfer from bus 16 to processor 20, via receive buffer 64. In such case the data may be received by bus 16 from flip-flop 19 as well as windows 12-1 through 12-7 by a right shift arrangement upon transfer, or, the character ready signal from decoder 66 may be utilized to right shift the bits in flip-flop 19 and windows 12-1 through 12-7 into windows 12-1 through 12-8 respectively after which the transfer of information would be enabled, or the bits may be directly transferred from flip-flop 19 and windows 12-1 through 12-7, with no transfer from window 12-8. After the transfer of information, the bus 20 resets the binary zero into that address of the character received by processor 20. The apparatus is now ready to receive another synchronous character.

The above explanation shows how apparatus similar to that shown in FIGS. 1 and 2 may be duplicated for both the transmit mode of operation and the receive mode of operation. It should be understood that both modes of operation may be combined into one apparatus. In such case, memories 10 would require a number of storage positions equal in number to twice the number of lines to be serviced. Further, the buffers 26 would best be duplicated for both the transmit and the receive mode of operation so that the RS signal would be distinct for each mode. The address counter would be set so that consecutive clock times are used to address the same line one clock time being utilized for the transmit mode and the next clock time being utilized for the receive mode. Thus the operation would be similar to that previously explained and would operate such that one would transmit and receive for the same communications line before the next communication line is addressed.

It should be understood that the timing indicated hereinabove for the operation of the apparatus of the invention may be altered without departing from the scope of the invention. For example, the operations set forth need not all occur during the same clock time. More than one clock time may be utilized for example for the circulating and shift register operation.

It will thus be seen that the objects set forth above among those made apparent in the preceding description are efficiently attained and since certain changes may be made in the above constructions without departing from the scope of the invention, it is intended that all matter contained in the above description or shown in the accompanying drawings shall be interpreted as illustrative and not in a limiting sense.

Having described the invention, what is claimed as new and novel and secured by Letters Patent is:

We claim:

1. The combination comprising:

A. a plurality of memories, each having a plurality of storage locations;

B. means for circulating binary data in each of said memories;

C. means for coupling one corresponding storage location in each of said memories in series circuit with each other;

D. means for shifting said binary data in said series circuit;

E. means for coupling a plurality of communication lines to said series circuit, wherein said plurality of storage locations is equal in number to the number of said communication lines, one of said storage locations in each memory associated with one of said communications lines; and F. second means for transferring said binary data in said series circuit with respective ones of said plurality of communication lines.

2. The combination as defined in claim 1 wherein:

A. said binary data comprises bits of characters; wherein

B. the number of said memories is equal to the number of bits in a character; and wherein C. said bits of a character which are to be communicated over a particular communication line circulate in said memories so that each bit of said character to be communicated is in corresponding storage locations of said memories at any given time during said circulation.

3. The combination as defined in claim 2 further comprising:

A. means for enabling in a predetermined sequence said communication lines to transfer said binary data with said series circuit; and wherein B. said second means for transferring includes means for transferring one bit of a character of said binary data with the communication line enabled each time the communication line is enabled by said means for enabling such that all bits of a character are transferred with the respective communication line after said character or portion thereof is circulated in said memories no greater than a number of times corresponding to the number of bits in said character.

4. The combination as defined in claim 2 further comprising:

A. means for indicating that one of said communication lines is ready to transmit a bit to one of said memories;

B. means for transferring said bit ready to be transmitted from said one of said communications lines to the last ordered one of said memories;

C. means for transferring successive bits of said character corresponding to said bit ready to be transmitted, said successive bits received by said last ordered one of said memories, said preceding received bits being shifted toward a first ordered one of said memories; and D. means for detecting that a complete character has been received by said memories.

5. The combination as defined in claim 4 wherein said means for detecting comprises:

A. a further memory similar to one of said plurality of memories, said further memory having its storage location associated with the receiving line preset to a unique binary signal condition before a bit of a character is received from said one of said lines; and wherein B. said last ordered memory is said further memory; and C. means for indicating the receipt of a complete character when said unique binary signal condition is shifted into said first ordered memory.

6. The combination as defined in claim 2 further comprising:

A. means for indicating that one of said communications lines is ready to receive a bit; wherein B. said means for shifting is enabled in response to a control signal; and C. means for transferring one bit of a character associated with the ready communications line to said ready communications line by means of said series circuit in response to said control signal.

7. The combination as defined in claim 6 wherein said one bit transferred by said means for transferring is that bit which is stored in said one corresponding storage location of the first ordered memory of said plurality of memories, wherein the other bits of the character of said one bit transferred are shifted to said one corresponding storage location of the next memory in a direction toward said first ordered memory in response to said control signal, and further comprising means for loading said one corresponding storage location of the last ordered memory with a first binary state signal in response to said control signal.

8. The combination as defined in claim 7 further comprising:

A. means for detecting the presence of said first binary state signals in each of said one corresponding storage locations of each of said memories upon the transfer of all of said bits of said character being transferred; and B. means for requesting another character for transfer in response to the detection of said first binary state signals in each of said one corresponding storage locations.

9. A memory system for communicating characters, each having a plurality of bits, over a plurality of communication lines, said memory system comprising:

A. a plurality of circulating memories, each said memory comprising a plurality of storage locations, an input, and an output, the number of said memories corresponding to the number of bits in a character, and the number of said locations not greater than the number of said lines;

B. a plurality of bistable storage means, the number of said bistable storage means equal to the number of said memories, each of said bistable storage means being associated with one of said memories;

C. means responsive to first signals for circulating bits from each of said memory outputs to the associated bistable storage means and from said associated storage means to the associated memory inputs;

D. means responsive to second signals for shifting bits stored in each of said bistable storage means serially through the next ordered ones of said plurality of bistable storage means toward a last ordered one of said bistable storage means; and E. means for transferring a bit in said last ordered one of said bistable storage means with a respective one of said communication lines.

10. A memory system as defined in claim 9 wherein said second signals are generated when one of said lines is ready for communicating at least one bit of a character.

11. A memory system as defined in claim 9 wherein the number of said locations and the location formed by said plurality of bistable storage means corresponds to the number of said communication lines.

12. A memory system as defined in claim 9 further comprising means for loading the first ordered one of said bistable storage means with a first binary state signal each time said bits are shifted in response to said second signal.

13. A memory system as defined in claim 12 further comprising means for detecting the presence of said first binary state signals in each of said bistable storage means thereby indicating the transfer of all of said bits of a character.

14. A memory system as defined in claim 13 wherein said means for detecting comprises:

A. a further circulating memory similar to each of said plurality of circulating memories, said further memory having each of its storage locations preset to a unique binary signal condition;

B. a further bistable storage means similar to each of said plurality of storage means, said further bistable storage means coupled to a first ordered one of said plurality of bistable storage means;

C. means for coupling said further bistable storage means to receive bits from a respective one of said communication lines; and D. means for indicating that all bits of a character have been received from said respective communication line when said unique binary signal condition has been shifted by said means for shifting from the last ordered one of said plurality of bistable storage means.

* * * * *